United States Patent
Monden et al.

(10) Patent No.: US 9,402,223 B2
(45) Date of Patent: Jul. 26, 2016

(54) METHOD FOR BUILDING AD HOC NETWORK

(75) Inventors: Kazuya Monden, Yokohama (JP); Atsushi Shimizu, Kawasaki (JP); Shoji Fukuzawa, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 76 days.

(21) Appl. No.: 13/541,538

(22) Filed: Jul. 3, 2012

(65) Prior Publication Data

US 2012/0269088 A1 Oct. 25, 2012

Related U.S. Application Data

(63) Continuation of application No. 11/822,285, filed on Jul. 3, 2007, now Pat. No. 8,238,259.

(30) Foreign Application Priority Data

Jul. 4, 2006 (JP) ................................ 2006-184381

(51) Int. Cl.
*H04L 12/26* (2006.01)
*H04W 40/14* (2009.01)

(52) U.S. Cl.
CPC .................................... *H04W 40/14* (2013.01)

(58) Field of Classification Search
None
See application file for complete search history.

(56) References Cited

U.S. PATENT DOCUMENTS

| 5,594,943 | A * | 1/1997 | Balachandran | 455/436 |
| 6,894,985 | B2 * | 5/2005 | Billhartz | 370/252 |
| 7,197,009 | B1 * | 3/2007 | Dispensa | 370/237 |
| 7,536,167 | B2 | 5/2009 | Gollnick et al. | |
| 2001/0014088 | A1 * | 8/2001 | Johnson et al. | 370/338 |
| 2002/0080739 | A1 | 6/2002 | Kuwahara | |
| 2002/0102977 | A1 * | 8/2002 | Shi | 455/437 |
| 2002/0142779 | A1 | 10/2002 | Goto et al. | |
| 2003/0065816 | A1 | 4/2003 | Dharmadhikari et al. | |
| 2004/0022177 | A1 * | 2/2004 | Awad | H04B 1/70755 370/204 |
| 2004/0106423 | A1 * | 6/2004 | McGowan et al. | 455/522 |
| 2004/0235439 | A1 | 11/2004 | Husted et al. | |
| 2005/0068965 | A1 | 3/2005 | Lin et al. | |

(Continued)

FOREIGN PATENT DOCUMENTS

| JP | 2005-064723 | 3/2005 |
| JP | 2005-523619 | 8/2005 |

(Continued)

OTHER PUBLICATIONS

Clausen, T., et al., "Optimized Link State Routing", RFC 3626, Oct. 2003, pp. 15-75, The Internet Society.

(Continued)

*Primary Examiner* — Minh-Trang Nguyen
(74) *Attorney, Agent, or Firm* — McDermott Will & Emery LLP

(57) ABSTRACT

Before software for a routing protocol in a second wireless terminal receives a routing packet between a first wireless terminal and the second wireless terminal that are both included in an ad hoc network, stability determining software determines whether or not a link between the first wireless terminal, which is the source of the routing packet, and the second wireless terminal is stable. When the link is determined to be stable, the software for the routing protocol in the second wireless terminal processes the routing packet. This allows building of a route using only a stable link between adjacent nodes.

18 Claims, 8 Drawing Sheets

(56) References Cited

U.S. PATENT DOCUMENTS

| | | | |
|---|---|---|---|
| 2005/0288008 A1 | 12/2005 | Shimizu et al. | |
| 2006/0069553 A1* | 3/2006 | Hakansson et al. | 704/222 |
| 2006/0077942 A1* | 4/2006 | Panwar et al. | 370/338 |
| 2006/0205424 A1* | 9/2006 | Dupcinov | H04L 45/00 455/513 |
| 2007/0191048 A1 | 8/2007 | Catreux-Erceg et al. | |
| 2007/0230407 A1 | 10/2007 | Petrie et al. | |
| 2007/0280172 A1 | 12/2007 | Tan et al. | |
| 2008/0095058 A1 | 4/2008 | Dalmases et al. | |
| 2008/0310340 A1 | 12/2008 | Isozu | |

FOREIGN PATENT DOCUMENTS

| | | |
|---|---|---|
| JP | 2005-252858 A | 9/2005 |
| JP | 2005-286405 A | 10/2005 |
| JP | 2005-341231 A | 12/2005 |
| JP | 2007-129542 A | 5/2007 |
| WO | WO 03/090083 A1 | 10/2003 |

OTHER PUBLICATIONS

Kamerman, A., et al., "WaveLAN®-II: A High Performance Wireless LAN for the Unlicensed Band", Bell Labs Technical Journal, Summer 1997, pp. 118-133.

Holland, G., et al., "A Rate-Adaptive MAC Protocol for Multi-Hop Wireless Networks", Jul. 2001, Proc. of ACM Mobicom, Rome.

R. Dube et al., "Signal Stability-Based Adaptive Routing (SSA) for Ad Hoc Mobile Networks," IEEE Personal Communications, Feb. 1997, pp. 36-45.

Chinese Office Action issued in Chinese Patent Application No. CN 2007101269250 dated Oct. 16, 2009.

An English Translation of Notification of Reasons for Refusal issued in Japanese Patent Application No. 2013-087133 mailed Dec. 17, 2013.

Japanese Office Action dated Jun. 30, 2015 issued in corresponding Japanese Patent Application No. 2014-158433, with English translation.

\* cited by examiner

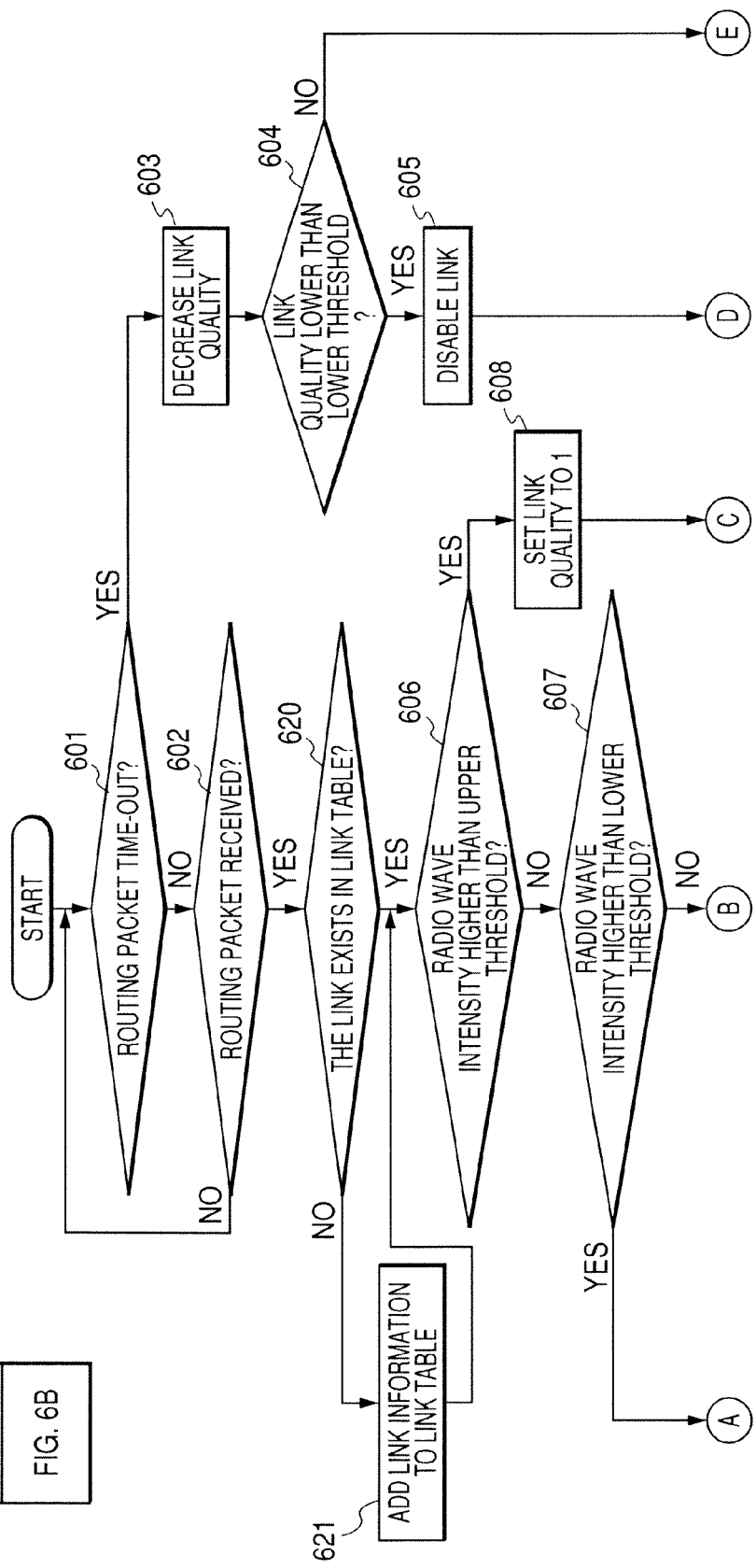

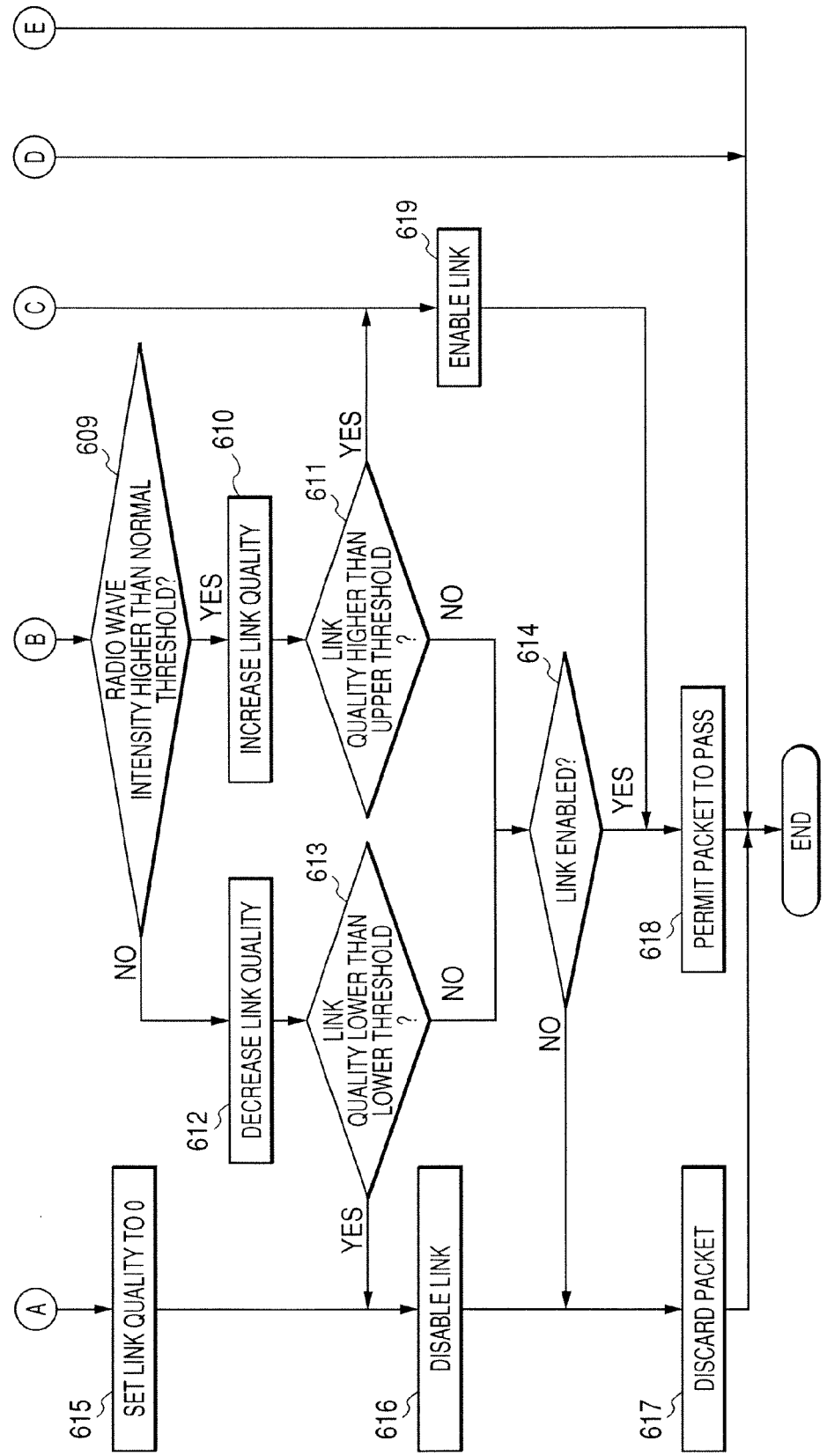

| | OPPOSITE WIRELESS TERMINAL ADDRESS | RECEIVING DEVICE | LINK QUALITY | LINK ENABLE FLAG | REMAINING TIME [S] |
|---|---|---|---|---|---|
| 806 | WIRELESS TERMINAL 2 | wlan0 | 0.8 | 1 | 2.00 |
| 807 | WIRELESS TERMINAL 3 | wlan0 | 0.3 | 0 | 1.00 |

FIG. 10

| OPPOSITE WIRELESS TERMINAL ADDRESS | RECEIVING DEVICE | LINK QUALITY | LINK ENABLE FLAG | REMAINING TIME [S] | UPPER THRESHOLD [dBm] | NORMAL THRESHOLD [dBm] | LOWER THRESHOLD [dBm] |
|---|---|---|---|---|---|---|---|
| WIRELESS TERMINAL 903 | wlan0 | 0.8 | 1 | 2.00 | −70 | −75 | −85 |
| WIRELESS TERMINAL 904 | wlan0 | 0.3 | 0 | 1.00 | −70 | −75 | −85 |
| WIRELESS TERMINAL 901 | wlan0 | 0.5 | 1 | 2.00 | −70 | −95 | −95 |

FIG. 11

| DESTINATION PORT NUMBER |
|---|
| ... |

METHOD FOR BUILDING AD HOC NETWORK

RELATED APPLICATIONS

The present application is a Continuation of U.S. application Ser. No. 11/822,285 filed on Jul. 3, 2007, now U.S. Pat. No. 8,238,259, which claims priority from Japanese Application JP 2006-184381 filed on Jul. 4, 2006, the contents of each of which are hereby incorporated by reference into this application.

BACKGROUND OF THE INVENTION (1) Field of the Invention

The present invention relates to a technology for building a good-quality communication route when performing wireless communications.

(2) Description of the Related Art

Among network technologies is an ad hoc network technology for dynamically building a wireless multi-hop network among nodes. In an ad hoc network, each node has a packet relay function and sends or forwards packets according to its routing table so as to perform multi-hop communications. Wireless multi-hop networks, in which a wireless link between adjacent nodes is detected by exchanging routing packets, have had a problem that a link of no good quality can be used when exchanging routing packets, due to variations in the state of wireless communications over a link caused by the surrounding circumstances and movement of each node. To counter this problem, there has been provided a technology that determines the quality of a link between adjacent nodes depending on the bit error rate to detect a link between adjacent nodes (see Japanese Patent Laid-Open No. 2005-523619).

Also, among link stability determining methods disclosed in a technical document RFC 3626 (T. Clausen, P. Jacquet, "Optimized Link State Routing Protocol (OLSR)" 2003/10) published by the Internet Engineering Task Force (IETF) is link hysteresis. This is a method for determining the stability of a link from routing packets that are intermittently arriving, when the state of wireless communications of the link cannot be obtained.

Wireless local area networks (LAN) allow the threshold of the reception radio wave intensity to be set up, thus creating a mechanism in which a packet whose radio wave intensity is lower than the threshold will be discarded.

SUMMARY OF THE INVENTION

The related-art technology disclosed in Japanese Patent Laid-Open No, 2005-523619 takes into no account the use of a protocol standardized by IETF when building an ad hoc network. Consequently, it has a problem that it must design a routing protocol and has no connectivity with a standard protocol.

As for link hysteresis disclosed in the technical document RFC3626, a link is determined to be stable when routing packets arrive periodically via the link, and variations in the radio wave state are taken into no account.

As for a wireless LAN, in which the threshold of the reception radio wave intensity is set up, even though a packet of user data can be received by a receiving node, the packet is discarded when the radio wave intensity is lower than the threshold. This results in loss of the packet.

This invention provides a method for building ad hoc network, an ad hoc network building program, and a terminal that takes into account the state of a radio wave to detect a stable link between nodes to reduce loss of packets of user data, while maintaining connectivity with a standard protocol.

According to an aspect of this invention, in a second wireless terminal for relaying data sent or received by a plurality of first wireless terminals, before software for a routing protocol receives a routing packet for building an ad hoc network, it is determined whether or not a link with one of the first wireless terminals, which is the source of the routing packet, is stable. Only when the link is determined to be stable, the software for the routing protocol processes the routing packet. This provides an ad hoc network building method for building a route using only a stable link between adjacent nodes.

According to another aspect of this invention, there is provided an ad hoc network building program to be executed by a processor in a wireless terminal that includes a wireless communication interface, a memory, and the processor electrically coupled to the wireless communication interface and the memory and relays data from a different wireless terminal. The program includes the steps of determining a stability situation of a wireless link, and executing a routing protocol using a routing packet when the wireless link is determined to be stable.

According to yet another aspect of this invention, there is provided a wireless terminal that relays data from a different wireless terminal and includes a wireless communication interface; a memory that stores a stabilization program that measures a stability situation of a wireless link between adjacent nodes, and a routing protocol that builds a route using a routing packet; and a processor that executes the stabilization program and the routing protocol stored in the memory. The processor executes the routing protocol using the routing packet when the processor executes the stabilization program and as a result determines a wireless link between adjacent nodes to be stable.

When the stability situation of a wireless link is determined, the communication quality is measured. The radio wave intensity is preferably used as an evaluation value of the communication quality. However, such an evaluation value is not limited to the radio wave intensity. The signal-to-noise ratio, the bit error rate, or the like may be used as such an evaluation value. Also, a routing packet is preferably used to determine the stability of a wireless link; however, packets other than a routing packet may be used to make such determination. Among packets other than a routing packet are a control packet of the wireless LAN and a communication packet of user data, and a part or all of these packets may be used.

The above-mentioned ad hoc network building method may further include determining a link quality value depending on an evaluation value of the communication quality obtained in this manner, enabling the link when the link quality value is higher than a set threshold, disabling the link when the link quality value is lower than another threshold, receiving the routing packet to pass it on to the routing protocol only when the link is enabled, and discarding the routing packet when the link is disabled.

BRIEF DESCRIPTION OF THE DRAWINGS

Embodiments of the present invention will be described in detail with reference to the accompanying drawings, wherein:

FIG. 6 is a process flow diagram of a stabilization algorithm 2 according to the first embodiment;

FIG. 10 is a diagram showing an example of the link table of a wireless terminal according to the second embodiment; and FIG. 11 is a diagram showing a method for identifying a routing packet using stabilization software according to the first and second embodiments.

DESCRIPTION OF THE PREFERRED INVENTION

Embodiments of the present invention will be described below in detail with reference to the accompanying drawings.

First Embodiment

Figure 1:
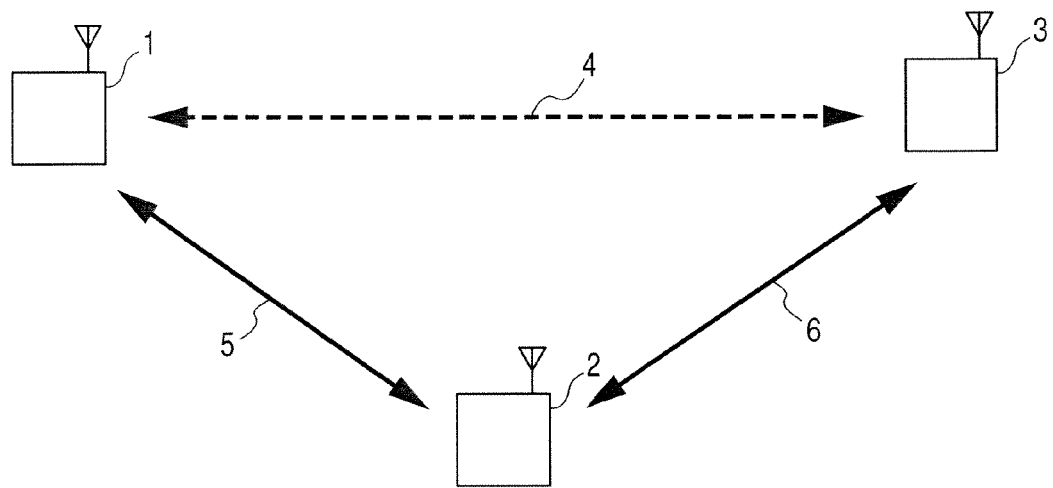
FIG. 1 is a diagram showing a network stabilization method according to a first embodiment.

FIG. 1 is a diagram showing a network stabilization method in ad hoc network according to a first embodiment of this invention.

In FIG. 1, wireless terminals 1 to 3 can communicate with one another. The terminals 1 and 3 are linked via an unstable wireless link 4 that has weak radio wave intensity or a high packet loss rate. The terminals 1 and 2 are linked via a stable wireless link 5 that has strong radio wave intensity or a low packet loss rate. The terminals 2 and 3 are linked via a stable wireless link 6 that has strong radio wave intensity or a low packet loss rate.

Figure 7:
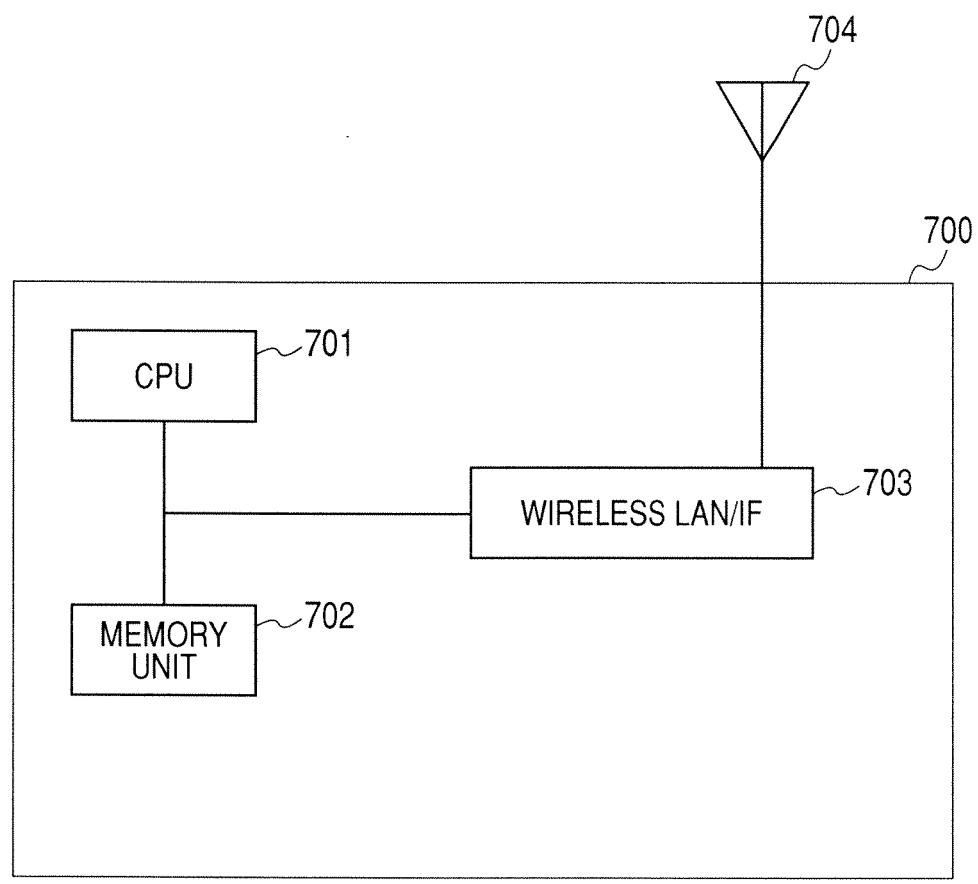
FIG. 7 is a diagram showing an example of the hardware configuration of a wireless terminal according to the first embodiment and a second embodiment.

FIG. 7 shows an example of the hardware configuration of the wireless terminals 1 to 3. A wireless terminal 700 represents each of the wireless terminals 1 to 3. The wireless terminal 700 includes a processor (CPU) 701, a memory 702, and a wireless communication interface (wireless LAN I/F) 703. The wireless LAN I/F 703 is coupled to an antenna 704. The wireless LAN I/F 703 and the antenna 704 allow the wireless terminal 700 to send or receive a packet. While the wireless terminal 700 according to this embodiment includes only one wireless communication interface, it can also includes a plurality of wireless communication interfaces.

Executing a program stored in the memory 702 by the CPU 701 allows the wireless terminal 700 to perform processing to be discussed below. The program may previously be stored in the memory 702 or may be loaded into the memory 702 as necessary via a detachable storage medium or a communication medium (wired, wireless, or optical network or other types of network, or carrier wave or digital signal on such a network) available to the wireless terminal 700.

In an ad hoc network, the above-mentioned wireless link detection is generally conducted by exchanging a packet called a "HELLO" message in a routing packet. When the exchanging of a HELLO message is conducted via the unstable wireless link 4 shown in FIG. 1, it is determined in the routing protocol that direct communication can be performed between the wireless terminals 1 and 3. This permits the unstable wireless link 4 to be used when a packet is sent from the wireless terminal 1 to the wireless terminal 3.

As a result, the possibility that packet loss occurs is increased, and the communication quality is deteriorated. In this embodiment, the unstable wireless link 4 is detected using the routing packet and then eliminated from among wireless links available as a communication route. Specifically, a packet sent from the wireless terminal 1 to the wireless terminal 3 is first sent to the wireless terminal 2 via the stable wireless link 5, and then the wireless terminal 2 forwards the packet to the wireless terminal 3 via the stable wireless link 6. This prevents the packet from passing through the wireless link 4 with a high packet loss rate, thereby maintaining high communication quality.

Figure 2:
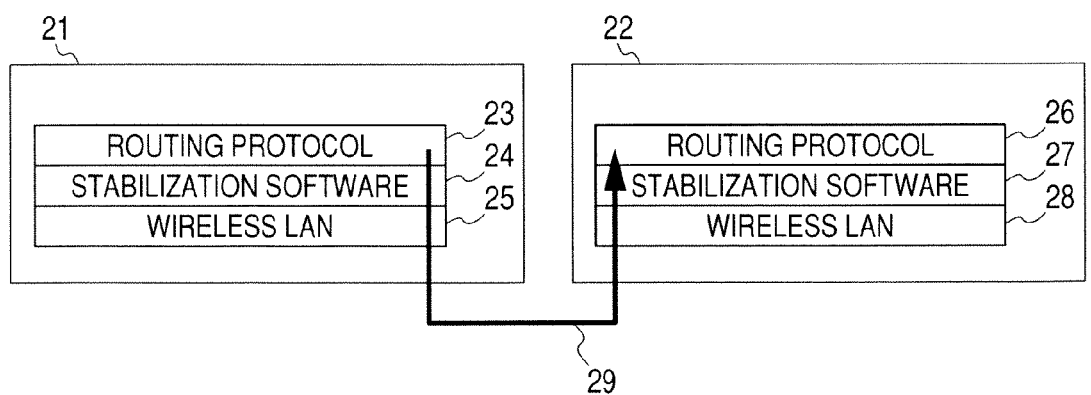
FIG. 2 is a diagram showing the layer structure of the network stabilization method according to the first embodiment.

FIG. 2 shows the layer structure of this embodiment. While this embodiment will be described assuming that wireless terminals communicate with each other using a wireless LAN, the communication method is not limited to one using a wireless LAN. Any communication method that allows wireless terminals to communicate with each other, including infrared communication, may be used.

Wireless terminals 21 and 22 include routing protocols 23 and 26, respectively. These routing protocols exchange a routing packet via wireless LANs 25 and 28. In this embodiment, a routing packet to be exchanged is passed on to stabilization software 24 or 27 before passed on to the routing protocols 23 or 26 so that the stabilization software 24 or 27 determines whether the wireless link between the wireless terminals 21 and 22 is stable. When the wireless link is determined to be stable, the packet is passed on to the routing protocol 23 or 26. For example, a routing packet sent from the routing protocol 23 in the wireless terminal 21 is sent from the wireless LAN 25 in the wireless terminal 21 and then received by the wireless LAN 28 in the wireless terminal 22. The received packet is passed on to the stabilization software 27 so that the stabilization software 27 determines whether or not the wireless link between the wireless terminal 21, which is the source of the received packet, and the wireless terminal 22 is stable based on the communication quality of the link. When the wireless link is determined to be stable, the packet is passed on to the routing protocol 26.

A packet flow 29 represents a flow of a packet from the routing protocol 23. Similarly a routing packet from the routing protocol 26 is passed on to the routing protocol 23 only when the stabilization software 24 in the wireless terminal 21 determines whether or not the wireless link between the wireless terminals 21 and 22 is stable and then the routing packet is determined to be stable. Interposing the stabilization software 24 and 27 between the routing protocol 23 and the wireless LAN 25 and between the routing protocol 26 and the wireless LAN 28, respectively, prevents the routing protocols 23 and 26 from receiving a routing packet via an unstable wireless link. This prevents the communication route built by routing the protocols 23 and 26 from including an unstable link. This embodiment is configured such that only a routing packet is a packet to be sent to the stabilization software 24 or 27 and none of other types of communication packets will be sent to these pieces of software.

As described above, a wireless LAN allows discarding of a packet whose radio wave intensity is less than a set threshold. However, this will be applied to all communication packets, resulting in loss of communication packets of user data other than the routing protocol. As a matter of course, a routing packet sent from a routing protocol need not be processed by stabilization software before the routing packet is sent from the wireless LAN.

A method for identifying a routing packet according to this embodiment is, for example, as follows. That is, a routing packet can be identified using a destination port number 802 in a UDP header B01 shown in FIG. 11. For example, an OLSR is assigned 698 by the Internet Assigned Number Authority (TANA) so as to be distinguished from packets of other protocols or user data.

Among methods for passing on a routing packet to the stabilization software before passing on the packet to the routing protocol is use of software, iptables, available on the Internet <URL: http://www.netfilter.org/> by netfilter project, [online], [searched on Jun. 27, 2006] when the operating system of the nodes such as the wireless terminals 21 and 22 is Linux. The iptables enables a received packet that matches a specified rule to be passed on to user space. Designating UDP as the protocol and 698 as the destination port in order to obtain a routing packet that matches the specified rule allows only an OLSR to be passed on to user space. Then, providing each of the software 24 and 27 according to this embodiment with a socket for receiving the passed-on packet allows reception of the matching packet obtained using the iptables. The socket can also be obtained by using a library, libipq, provided by the netfilter project. Further, use of the libipq allows the stabilization software 24 and 27 to operate, that is, pass on the packet passed on from the iptables to the corresponding routing protocol or discard the packet.

Figure 3:
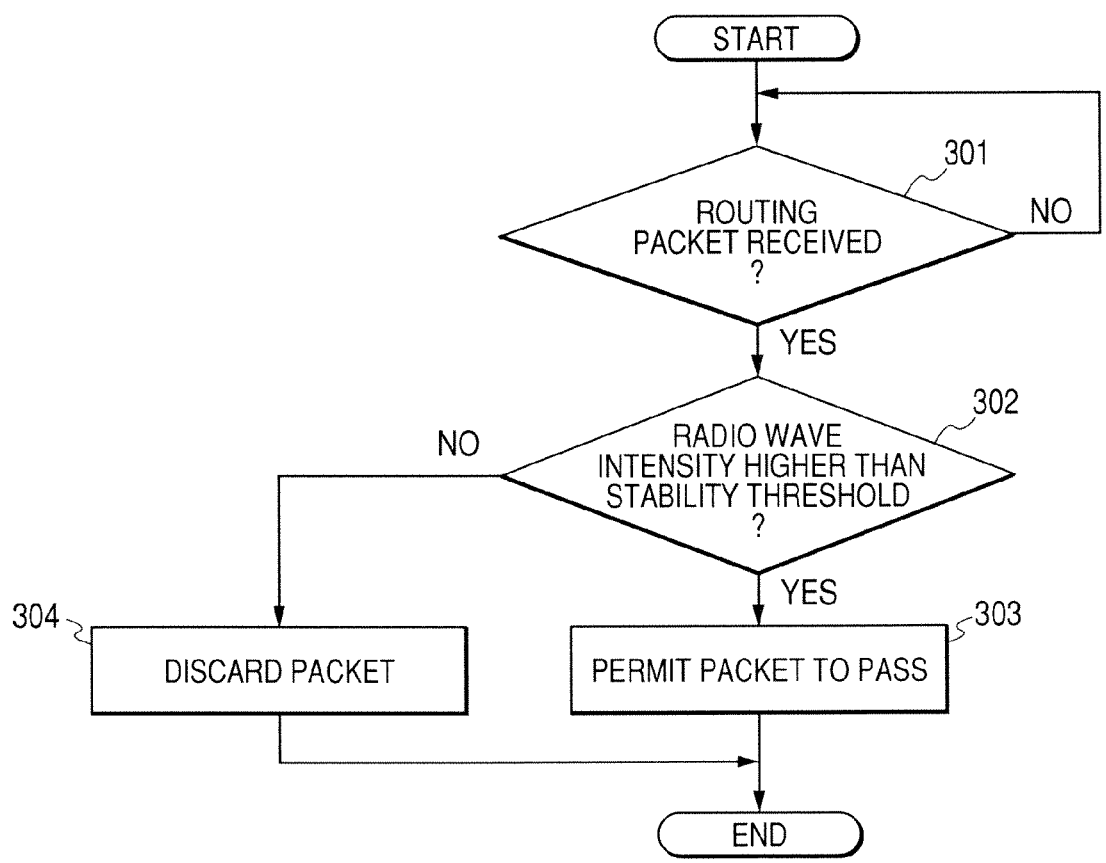
FIG. 3 is a process flow diagram of a stabilization algorithm 1 according to the first embodiment.

FIG. 3 shows a stability determining algorithm 1 of the stabilization software 24 and 27 using the radio wave intensity, according to this embodiment. Assume that a threshold for determining stability is previously set up. When a routing packet is received (yes in step 301), it is examined whether or not the radio wave intensity of the link with the source of the routing packet is higher than the above-mentioned stability threshold. When the intensity is higher than the threshold (yes in step 302), the stabilization software 24 or 27 permits the packet to pass through, and passes on the packet to the corresponding routing protocol. When the intensity is less than the threshold (no in step 302), the stabilization software 24 or 27 discards the packet without passing it on to the corresponding routing protocol.

Among methods for obtaining the radio wave intensity is to specify the MAC address of the source using software, iwspy, included in software, Wireless Tools for Linux, (online), [searched on Jun. 27, 2007], Internet<URL: http:/www.-hpl.hp.com./personal/Jean_Tourrilhes/Linix/Tools. html> when the operating system is Linux. Also, using a library, libiw, used by the iwspy allows these pieces of stabilization software to include a function for obtaining the radio wave intensity.

The stability determining algorithm 1 shown in FIG. 3 allows an unstable link to be excluded. However, when the set radio wave intensity of a wireless link between wireless terminals is near the set threshold, variations in radio wave intensity of the wireless link with time cause variations in stability/instability determination regarding the received routing packet. This alternately causes passing and discarding of routing packets, that is, causes intermittent arrival of packets. As a result, the communication route is frequently changed, thus making it possible for packets to be lost.

As for link hysteresis of OLSR described above, the go/no-go of use of a wireless link is determined based on the link quality and the link enable flag. An upper threshold and a lower threshold are set up with respect to the link quality. As a routing packet arrives, the link quality is increased. When the link quality is higher than the upper threshold, the link enable flag is set. On the other hand, when no routing packet arrives even when a routing packet arrival time comes, the link quality is decreased. When link quality is lower than the lower threshold, the link enable flag is cleared. The link is enabled only when the link enable flag is set. In the case of link hysteresis, even when the state of the wireless link becomes better thanks to movement of the wireless terminal or for other reasons, it takes time for the link to be enabled because routing packets must continuously arrive until the link quality exceeds the upper threshold. Further, even when the state of the wireless link becomes worse due to movement of the wireless terminal or for other reasons, it takes time for the link to be disabled due to gradual deterioration of the link quality. As a result, an unstable route is used as the communication route.

Figures 8, 9:
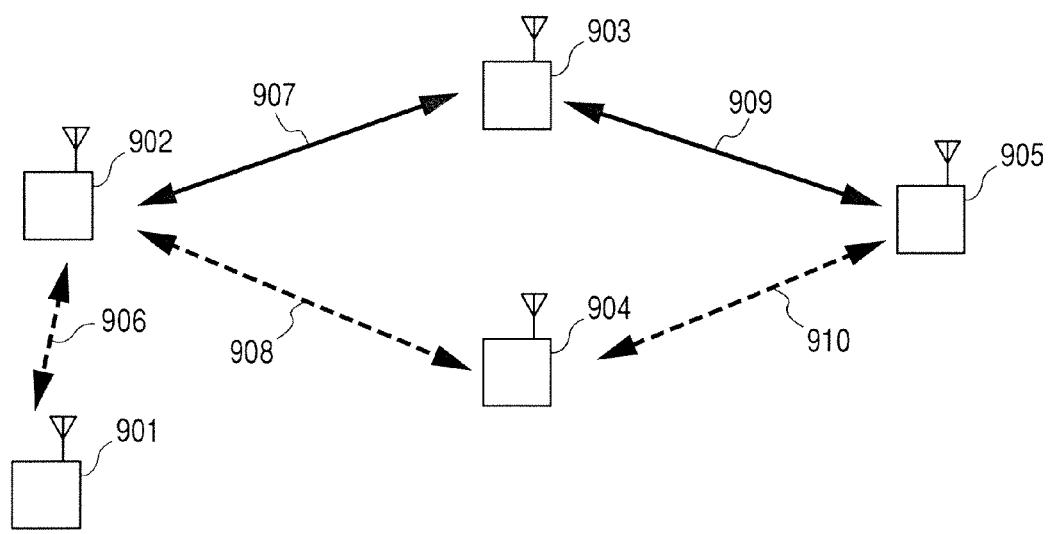
FIG. 8 is a diagram showing an example of the link table of a wireless terminal according to the first embodiment.
FIG. 9 is a diagram showing an example of the configuration of an ad hoc network according to the second embodiment.

On the other hand, when the state of the wireless link becomes better thanks to movement of the wireless terminal or for other reasons, changing the increase rate of the link quality depending on the reception radio wave intensity at the time of reception of a routing packet allows reduction of the time taken until the link is enabled. Also, when the state of the wireless link becomes worse due to movement of the wireless terminal or for other reasons, deteriorating the link quality depending on the radio wave intensity even though a routing packet is received as well as changing the deterioration rate of the link quality depending on the radio wave intensity allows the reduction of the time taken until the link is disabled. This allows reduction of the time when an unstable link is used as the communication route. This is defined as a stabilization algorithm 2. Each wireless terminal has a link table in which the states of the wireless links are described. FIG. 8 shows an example of the link table of the wireless terminal 1.

Column 801 contains pieces of information for specifying the sending interfaces of the wireless terminals opposite to the wireless terminal 1, such as the MAC addresses or the IP addresses of those wireless terminals. Column 802 contains wireless LAN interfaces for receiving a routing packet from the opposite wireless terminals. Column 803 contains the values representing the current quality of the links. Column 804 contains link enable flags. When a link is enabled, 1 is set up, and when the link is disabled, 0 is set up. Column 805 contains time intervals remaining until time-out. Row 806 contains information on the link with the wireless terminal 2, and row 807 contains information on the link with the wireless terminal 3.

Now the above-mentioned stabilization algorithm 2 will be described with reference to FIGS. 4 and 5.

Figure 4:
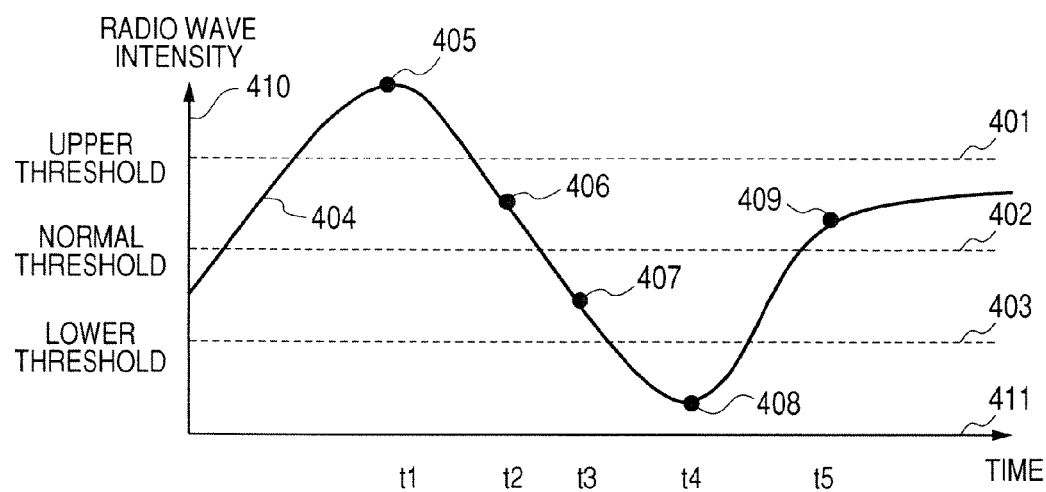
FIG. 4 is a diagram showing an example of variations in the radio wave intensity of a wireless link according to the first embodiment.

In FIG. 4, a longitudinal axis 410 represents the radio wave intensity and a transverse axis 411 represents the time. A curve 404 represents the radio wave intensity varying with time. The radio wave intensity at the times when a routing packet has been received is represented by points 405 to 409 and these times are represented by t1 to t5. The increase rate of the link quality varies in two stages. When the reception radio wave intensity is higher than a normal threshold 402, the link quality is increased. Further, when the reception radio wave intensity is higher than an upper threshold 401, the link quality is set to the maximum value. When the reception radio wave intensity is lower than the normal threshold 402, the link quality is decreased. When the reception radio wave intensity is lower than a lower threshold 403, the link quality is set to the minimum value.

Figure 5:
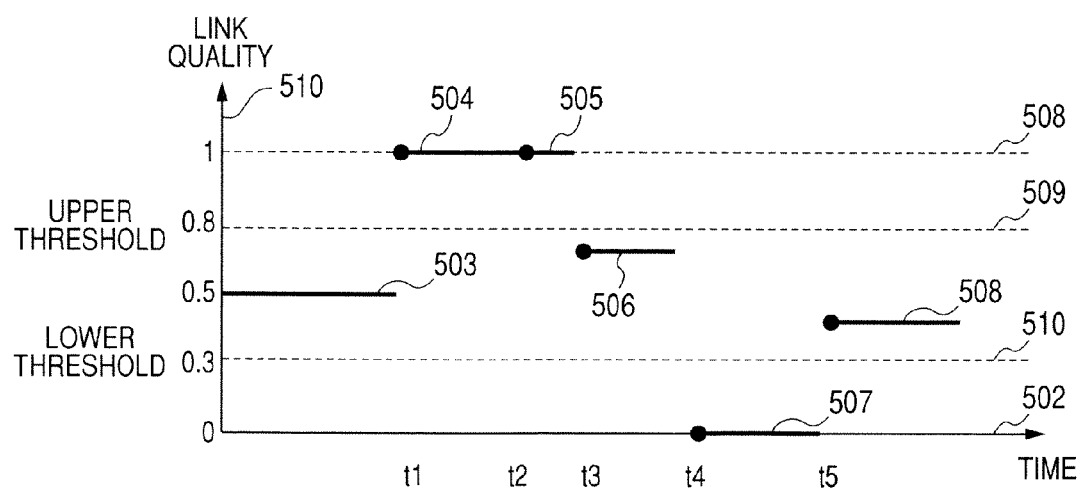
FIG. 5 is a diagram showing an example of variations in link quality according to the first embodiment.

In FIG. 5, a longitudinal axis 501 represents the link quality and a transverse axis 502 represents the time. The link quality is designated by a value in the range of 0 to 1. A maximum value 508 is assumed to be 1, and a minimum value 502 to be 0. When the link quality is higher than an upper threshold 509, a link enable flag is set.

When the link quality is lower than a lower threshold 510, the link enable flag is cleared. An initial value 503 of the link quality is assumed to be 0.5. Now, variations in link quality caused by arrival of routing packets will be described. At time t1 the radio wave intensity 405 is higher than the upper threshold, so the link quality is increased to the maximum value (504) and a link enable flag is set. As a result the routing packet is permitted to pass through. At time t2, the radio wave intensity 406 is higher than the normal threshold, so the link quality must be increased. However, since the link quality is already the maximum value, the link quality remains the maximum value (505). At time t3, the radio wave intensity 407 is lower than the normal threshold, so link quality is decreased. While the quality decrease rate can be arbitrarily set up, assume here that the link quality is decreased by 30%. Accordingly, the link quality is decreased from the maximum, 1, to 0.7 (506).

Since the link quality is lower than the upper threshold but the link enable flag is set, a routing packet is permitted to pass through. At time t4, the radio wave intensity 408 is lower than the lower threshold, so the link quality is decreased to the minimum value, 0. At this time, the link quality is lower than the lower threshold, so the link enable flag is cleared and a routing packet is discarded. At time t5, the radio wave intensity 409 is higher than the normal threshold and lower than the upper threshold, so the link quality is increased at the set increase rate. While the increase rate can be arbitrarily set up, assume here that the link quality is increased uniformly by 0.4. Alternatively, it is also possible to obtain new link quality by (link quality×increase rate+constant). At time 5t, the link quality is not higher than the upper threshold and the link enable flag is not set, so a routing packet is discarded. According to this algorithm, routing packets are permitted to pass through in the period from time t1 to time t3 and are discarded in the period from time t4 to time t5.

FIG. 6 shows a flowchart of the stabilization algorithm 2. Reference numerals 601 to 621 represent the steps in the flowchart.

In addition to whether or not the radio wave intensity of an arriving routing packet is lower than the normal threshold, time-out by which the link quality is decreased in consideration of loss of routing packets when no routing packets arrive within a set period is considered as a factor for decreasing the link quality. When the remaining time designated in column 805 of the link table is exhausted and the time-out of a routing packet occurs (yes in step 601), a link quality 803 of the link is decreased (step 603). When the link quality is lower than the lower threshold (yes in step 604), a link enable flag 804 is cleared, disabling the link (step 605). When the link quality 803 does not fall below the lower threshold of the link quality (no in step 604), the link enable flag 804 is not changed and the algorithm returns to step 601. When a routing packet is received (yes in step 602) before the time-out of a routing packet occurs (no in step 601), it is checked whether or not there is link information matching with respect to the source of the routing packet and the receiving interface in the link table (step 620). When there is no such link information (no in step 620), link information is added to the link table (step 621). When there is such link information in the link table (yes in step 620), the radio wave intensity of the wireless link is examined. When the radio wave intensity is higher than the upper threshold (yes in step 606), the link quality 803 is set to the maximum, 1 (step 608), and the link enable flag 804 is set (step 619).

When the radio wave intensity is lower than the upper threshold (no in step 606) and also lower than the lower threshold (yes in step 607), the link quality 803 is set to the minimum, 0, the link enable flag 804 is cleared, and the link is disabled (step 616), and the received routing packet is discarded (step 617). When the radio wave intensity is not lower than the lower threshold (no in step 607) and is higher than the normal threshold (yes in step 609), the link quality 803 is increased (step 610). When the link quality is higher than the upper threshold (yes in step 611), the link enable flag 804 is set (step 619). When the link quality is lower than the upper threshold (no in step 611), the set the link enable flag 804 is checked (step 614). When the link is enabled (yes in step 614), the packet is permitted to pass through (step 618). When the link is disabled (no in step 614), the packet is discarded (step 617). When the radio wave intensity is lower than the normal threshold (no in step 609), the link quality is decreased (step 612) and whether or not the link quality 803 is lower than the lower threshold is checked (step 613). When the link quality 803 is lower than the lower threshold (yes in step 613), the link is disabled (step 616) and the packet is discarded (step 617). When the link quality 803 is higher than the lower threshold (no in step 613), the link enable flag 804 is checked (step 614). When the link is enabled (yes in step 614), the packet is permitted to pass through (step 618). When the link is disabled (no in step 614), the packet is discarded (step 617).

The above-mentioned algorithm allows an unstable wireless link to be excluded from an ad hoc network so that a stable communication route with less loss of packets is built. This allows reduction of loss of packets due to frequent route changes. Further, when a wireless terminal is moved, it is possible to detect deterioration of communications and to switch the communication route to a new one, before the communications are disrupted. This allows reduction of loss of packets at the time of switching between communication routes.

Second Embodiment

There are cases in which all wireless terminals included in an ad hoc network cannot adopt the stabilization method described above. Among such cases are a case in which a wireless terminal cannot obtain the radio wave intensity and a case in which the operating system of a wireless terminal has no function of passing on a routing packet to stabilization software before passing on it a routing protocol. Incidentally, OLSR allows a Willingness value to be set up for each wireless terminal. Use of a Willingness value allows changing of each wireless terminal's readiness to become a relay terminal in a communication route.

Therefore, changing the Willingness values of a terminal that can use the stabilization method and a terminal that cannot use the stabilization method to change both terminals' readiness to become a relay terminal allows a route with less loss of packets to be selected.

Referring now to FIG. 9, a method for selecting a route when building an ad hoc network in which wireless a terminal that can use the stabilization method and a terminal that cannot use the stabilization method are mixed will be described as a second embodiment of this invention. Wireless terminals 901 to 905 are included in an ad hoc network. Assumed that the wireless terminal 903 is a terminal that can use the above-mentioned stabilization method and other wireless terminals are terminals that do not use the stabilization method. The wireless terminals 901 and 902 can communicate with each other via a wireless link 906. The wireless terminals 902 and 904 can communicate with each other via a wireless link 908. The wireless terminals 904 and 905 can communicate with each other via a wireless link 910. When a wireless link used as a communication route is a wireless link that is effective for both wireless terminals that can communicate with each other, that is, a so-called bidirectional link, wireless links 907 and 909 between the wireless terminal 903 using the stabilization method and the wireless terminals 902 and 905 not using the stabilization method, respectively, are considered as stable bidirectional wireless links when these links are determined to be stable using the stabilization method of the wireless terminal 903. When these links are not determined to be stable using the stabilization method of the wireless terminal 903, routing packets from the wireless terminals 902 and 905 received by the wireless terminal 903 are discarded. As a result, no bidirectional links are established and the wireless links 902 and 905 are not used as a communication route. Therefore, when either one of wireless terminals at both ends of a wireless link can use the stabilization method, the stability of the wireless link can be determined.

In FIG. 9, wireless links 907 and 909 are reliable, stable wireless links, while wireless links 906, 908, and 910 are links whose stability is uncertain. Increasing the Willingness value of the wireless terminal 903 to make the wireless terminal 903's readiness to become a relay terminal higher than that of each of the wireless terminals not using the stabilization method allows selection of a stable wireless link when stable wireless links and wireless links whose stability is uncertain are candidates in selecting a communication route. This can reduce loss of packets.

Use of the stabilization method disadvantageously reduces communication range of wireless terminals because a routing packet received via an unstable link that is of no good quality is discarded. It is preferable that communication routes among all wireless terminals can be built using only stable links in an ad hoc network. However, it is not always possible to build such an ad hoc network. For example, in FIG. 9, assume that the wireless terminals 901 to 905 use the stabilization method and the wireless link 906 is an unstable link. The wireless terminal 901 can establish no wireless link with other wireless terminals and thus cannot communicate with those wireless terminals. In this case, lowering the threshold of the radio wave intensity with respect to the wireless link 906 at both the wireless terminals 901 and 902 allows use of the wireless link 906 as a communication route so that the wireless terminal 901 and wireless terminals can communicate with each other. Incidentally, when the thresholds of the radio wave intensity with respect to all wireless links are lowered at the wireless terminal 902, the thresholds with respect to the wireless links 907 and 908 are also lowered. This creates a possibility that an unstable link may be used as a communication route. To prevent this happening, only the threshold with respect to a wireless link that has no alternative communication route must be lowered. Thus, the stability of communication routes is maintained.

Now a method for enabling communications with the wireless terminal 901 will be described with reference to FIGS. 9 and 10. FIG. 10 is an extension of the link table shown in FIG. 8. Column A06 contains the upper thresholds of the radio wave intensity, column A07 contains the normal thresholds thereof, and column A08 contains the lower thresholds thereof.

FIG. 10 is an example of the link table the wireless terminal 902. Row A09 contains information on the wireless link 907, row A10 contains information on the wireless link 908, and row A11 contains information on the wireless link 906.

Communication routes made up of routing protocols are described in the routing table of each wireless terminal. When the wireless terminal 902 receives a routing packet from the wireless terminal 901, the routing table of the wireless terminal 902 is checked. When the address of the wireless terminal 901, which is the source of the routing packet, is not described in the routing table, the wireless terminal 901 can be considered a wireless terminal that has no alternative route. Therefore, the normal and lower thresholds in row A11 are lowered. As a result, the routing packet from the wireless terminal 901 is passed on to the routing protocol of the wireless terminal 902. Similarly, lowering the normal and lower thresholds with respect to a routing packet from the wireless terminal 902 in the wireless terminal 901 allows the routing packet to be passed on to the routing protocol of the wireless terminal 901, thereby establishing a bidirectional link. This allows a communication route to be built, thus enabling communications. Leaving the normal and lower thresholds lowered may permit an unstable direct link to be selected as a communication route, even though a stable alternative route via another wireless terminal is made available between the wireless terminals 901 and 902. For this reason, the temporarily lowered normal and lower thresholds return to the original set thresholds upon elapsing of a set time. At this time, when the direct link is not a stable link, the route addressed to the wireless terminal 901 is temporarily deleted. However, when a stable alternative route exists, it is possible to switch the communication route to the stable alternative route, so the direct link is again registered with the routing table. Thereafter, when the wireless terminal 902 receives a routing packet from the wireless terminal 901 with the link between the wireless terminals 901 and 902 remaining unstable, the wireless terminal 902 discards the routing packet without lowering the normal and lower thresholds because the wireless terminal 901 is already described in the routing table.

As a matter of course, when the link stability determination according to the second embodiment is made, it is also possible to use the algorithm described in the first embodiment and shown in FIG. 6, as well as to use the algorithm shown in FIG. 3.

While the stability of a wireless link is determined using a routing packet in the first and second embodiments, packets other than a routing packet can be used to make such determination. Among packets other than a routing packet are a beacon packet, which is a control packet for a wireless LAN, and a communication packet of user data. A part or all of these packets can be used to determine the stability of a wireless link. Even though a packet other than a routing packet is used, a routing packet alone is a packet to be received or discarded. As described in the first embodiment, a routing packet is sent to stabilization software using the iptables and then processed there using the libipq, that is, received or discarded.

For example, as the radio wave intensity to be referred to in step 302 shown in FIG. 3, the radio wave intensity of a beacon packet of the wireless LAN, a packet of user data, or the like received immediately before a reference is received can be used instead of the radio wave intensity of a routing packet. It is also possible to use a packet other than a routing packet in the algorithm for determining stability shown in FIG. 6. In steps 601 and 602, either one or both of a beacon packet of the wireless LAN and a packet of user data can be used.

This invention allows building of communication route of good quality in an ad hoc network while maintaining connectivity with a standard protocol.

What is claimed is:

1. A method for building an ad hoc network including a plurality of wireless terminals for sending or receiving data, the method comprising steps of:
   if a first wireless terminal from the plurality of wireless terminals of the ad hoc network establishes a wireless link with a second wireless terminal from the plurality of wireless terminals, determining whether the first wireless terminal includes address information of the second wireless terminal;
   if the first wireless terminal does not include the address information of the second wireless terminal, comparing communication quality of the wireless link between the first wireless terminal and the second wireless terminal with a first set threshold of the first wireless terminal;
   changing the first threshold by lowering the first set threshold with a specific amount, based on the comparison, and
   if the first wireless terminal includes the address information of the second wireless terminal, keeping the first set threshold without lowering the first set threshold.

2. The method for building an ad hoc network according to claim 1, the changing step further comprising:
   lowering a second set threshold of the second wireless terminal with a specific amount, so that a communication quality of a wireless link between the second wireless terminal and only one other wireless terminal from the plurality of wireless terminals becomes higher than the lowered second threshold.

3. The method for building an ad hoc network according to claim 2, further comprising the step of:
   re-changing the lowered second threshold to the second set threshold.

4. The method for building an ad hoc network according to claim 3, wherein the re-changing step is executed after an elapse of a specified time.

5. The method for building an ad hoc network according to claim 1, the method further comprising the steps of:
   comparing the communication quality of the wireless link between the first wireless terminal and the second wireless terminal with a second set threshold of the second wireless terminal;
   changing the second threshold by lowering the second set threshold with a specific amount associated with the second wireless terminal, based on the comparison; and
   establishing the wireless link between the first wireless terminal and the second wireless terminal, based on the lowered second threshold.

6. The method for building an ad hoc network according to claim 1, wherein lowering the first set threshold of the first wireless terminal with the specific amount causes a communication quality of a wireless link between the first wireless terminal and only one other wireless terminal from the plurality of wireless terminals to become higher than the lowered first threshold.

7. The method for building an ad hoc network according to claim 1, wherein the wireless link is a bidirectional link.

8. The method for building an ad hoc network according to claim 1, wherein each of the first and the second wireless terminals includes a routing table.

9. The method for building an ad hoc network according to claim 8, wherein upon receiving a routing packet from the first wireless terminal by the second wireless terminal, the second wireless terminal determines whether the address information of the first wireless terminal is in the routing table of the second wireless terminal.

10. A system for building an ad hoc network including a plurality of wireless terminals for sending or receiving data, the system comprising:
    one or more processors; and
    non-transitory computer-readable medium comprising instructions stored therein, which when executed by the processors, cause the processors to perform operations comprising:
    if a first wireless terminal from the plurality of wireless terminals of the ad hoc network establishes a wireless link with a second wireless terminal from the plurality of wireless terminals, determining whether the first wireless terminal includes an address information of the second wireless terminal;
    if the first wireless terminal does not include the address information of the second wireless terminal, comparing communication quality of the wireless link between the first wireless terminal and the second wireless terminal with a first set threshold of the first wireless terminal;
    changing the first threshold by lowering the first set threshold with a specific amount, based on the comparison, and
    if the first wireless terminal includes the address information of the second wireless terminal, keeping the first set threshold without lowering the first set threshold.

11. The system of claim 10, the changing step further comprising:
    lowering a second set threshold of the second wireless terminal with a specific amount, so that a communication quality of a wireless link between the second wireless terminal and only one other wireless terminal from the plurality of wireless terminals becomes higher than the lowered second threshold.

12. The system of claim 11, the operations further comprising:
    re-changing the lowered second threshold to the second set threshold.

13. The system of claim 12, wherein the re-changing step is executed after an elapse of a specified time.

14. The system of claim 10, the operations further comprising:
    comparing the communication quality of the wireless link between the first wireless terminal and the second wireless terminal with a second set threshold of the second wireless terminal;
    changing the second threshold by lowering the second set threshold with a specific amount associated with the second wireless terminal, based on the comparison; and
    establishing the wireless link between the first wireless terminal and the second wireless terminal, based on the lowered second threshold.

15. The system of claim 10, wherein lowering the first set threshold of the first wireless terminal with the specific amount causes a communication quality of a wireless link between the first wireless terminal and only one other wireless terminal from the plurality of wireless terminals to become higher than the lowered first threshold.

16. The system of claim 10, wherein the wireless link is a bidirectional link.

17. The system of claim 10, wherein each of the first and the second wireless terminals includes a routing table.

18. The system of claim 17, wherein upon receiving a routing packet from the first wireless terminal by the second wireless terminal, the second wireless terminal determines whether the address information of the first wireless terminal is in the routing table of the second wireless terminal.

* * * * *